(12) United States Patent
Park et al.

(10) Patent No.: US 8,300,947 B2
(45) Date of Patent: Oct. 30, 2012

(54) METHOD AND APPARATUS FOR ESTIMATING OBJECT CONTOUR IN A MOVING PICTURE

(75) Inventors: Young-O Park, Seongnam-si (KR);
Kwan-Woong Song, Seoul (KR);
Young-Hun Joo, Yongin-si (KR);
Kwang-Pyo Choi, Anyang-si (KR);
Yun-Je Oh, Yongin-si (KR); Chang-Su Kim, Seoul (KR); Jae-Kyun Ahn, Seoul (KR)

(73) Assignees: Samsung Electronics Co., Ltd., Yeongtong-gu, Suwon-si, Gyeonggi-do (KR); Korea University Industrial & Academic Collaboration Foundation, Seongbuk-Gu, Seoul (KR)

( * ) Notice: Subject to any disclaimer, the term of this patent is extended or adjusted under 35 U.S.C. 154(b) by 274 days.

(21) Appl. No.: 12/322,250

(22) Filed: Jan. 30, 2009

(65) Prior Publication Data

US 2009/0196507 A1    Aug. 6, 2009

(30) Foreign Application Priority Data

Feb. 1, 2008   (KR) .................. 10-2008-0010670

(51) Int. Cl.
*G06K 9/48* (2006.01)

(52) U.S. Cl. ........ 382/199; 382/173; 382/287; 382/232; 375/240.01

(58) Field of Classification Search .................. 382/232, 382/233, 173, 199, 287, 304, 305; 375/240.1, 375/240.01, 240.03, 240.12, 240.16, 240.24; 348/568, 575
See application file for complete search history.

(56) References Cited

U.S. PATENT DOCUMENTS 8,126,210 B2 *   2/2012   Fardi .............................. 382/106
2003/0235341 A1 * 12/2003   Gokturk et al. ............... 382/243
* cited by examiner

*Primary Examiner* — Ali Bayat
(74) *Attorney, Agent, or Firm* — Cha & Reiter, LLC

(57) ABSTRACT

A method and apparatus for estimating the contour of a user object in a moving picture during video communications so that a personal background image is not provided during video communications. Information about center coordinates as well as a size of a face of the user object is extracted from a moving picture frame. Edges are extracted from the moving picture frame, and a boundary of a head of the user object is estimated using a semicircle. The boundaries of left and right shoulders and left and right arms of the user object are estimated using second-order function graphs that overlap a largest portion of the edges. An entire contour of the user object is estimated according to the boundaries of the head, the left and right shoulders, and the left and right arms of the user object.

26 Claims, 7 Drawing Sheets
(1 of 7 Drawing Sheet(s) Filed in Color)

METHOD AND APPARATUS FOR ESTIMATING OBJECT CONTOUR IN A MOVING PICTURE

CLAIM OF PRIORITY

This application claims the benefit of priority under 35 U.S.C. §119(a) from a Korean Patent Application filed in the Korean Intellectual Property Office on Feb. 1, 2008 and assigned Serial No. 2008-10670, the entire disclosure of which is hereby incorporated by reference in its entirety.

BACKGROUND OF THE INVENTION

1. Field of the Invention

The present invention relates to a method and apparatus for motion picture estimation. More particularly, the present invention relates to shielding a user's privacy during video communications or a video call.

2. Description of the Related Art

The increased development of moving picture compression and transmission technologies has increased the popularity of video communications and/or video calls because of the ability to transmit and receive better quality communications at increasingly lower costs. Yet, there has been little progress in technically overcoming any of the adverse effects relating to the video communications. For example, a major adverse effect of the video communications is that the place where a user is located is broadcast along with his/her image, thus impairing his/her privacy because the contents of one's room (and/or the condition e.g. clean, sloppy, etc.) is often in the background of the user's image. To avert this problem and render the video communications active, a technique for distinguishing an object from a background in video communications and processing them separately is required. According to such a technique, the identified background can be replaced by another background, the place of the user is not known.

Techniques have been proposed in the art to distinguish an object from a background in a moving picture. A major technique is referred to as a Snake Algorithm that represents the boundary between an object and a background as straight lines.

The Snake Algorithm detects the contour of the object by repeatedly moving from user-input snake points toward points that minimize an energy function. To be more specific, N points are set for the silhouette of the object and N–1 straight lines sequentially connecting the N points are computed. The edge energy, elastic energy, and bend energy of the whole straight line are computed and points with a minimum sum of energies are estimated within a predetermined range. In this manner, the N points are updated repeatedly until they converge to optimal points with minimum energies. The final estimated combination of straight lines then forms the contour of the object, as the object is thereby distinguished from the background.

Therefore, the Snake Algorithm separates the object from the background by computing the energies of straight lines. Since energies are computed, optimized data can be extracted for a total of pixels. Also, with the repetition-based convergence, data is automatically achieved. However, the conventional Snake Algorithm has some shortcomings in application to video communication or video calls under a mobile environment.

First, it is difficult to determine that points with optimal edge, elastic, and bending energies form the silhouette of an object in an image with a complex background. Especially when the background has many edges and colors, silhouette extraction is much more difficult when using the Snake Algorithm. This drawback of the Snake Algorithm means that the requirement for the Snake Algorithm is a simple background for greater accuracy. This simple background requirement is a severe restriction to video communications made through a portable terminal in the mobile environment.

Moreover, the estimation of N points based on repeated computations of minimum energies requires a large volume of computation and takes a certain amount of time to complete. There are difficulties in determining the initial N points and setting the range within which the N points should be located. With the aforementioned shortcomings, the conventional Snake Algorithm is not suitable for the estimation of object contours in portable terminal-based video communications. Accordingly, there exists a need for a technique for distinguishing an object from a background, to suit portable terminal-based video communications and video calls.

SUMMARY OF THE INVENTION

An aspect of exemplary embodiments of the present invention is to provide a method and apparatus for estimating the contour of an object in a moving picture having at least some of the advantages described herein below. Accordingly, an exemplary aspect of the present invention is to provide a method and apparatus for estimating the contour of an object in a moving picture, suitable for portable terminal-based video communications and video calls.

In accordance with an exemplary aspect of the present invention, there is provided a method for estimating the boundary between a background and a user object in a moving picture during video communications, in which information about center coordinates and a size of a face of the user object is extracted from a moving picture frame, edges are extracted from the moving picture frame, a boundary of a head of the user object is estimated using a semicircle, boundaries of left and right shoulders and left and right arms of the user object are estimated using second-order function graphs that overlap the edges as much as possible (i.e. a largest portion of overlap), and a whole (entire) contour of the user object is estimated according to the boundaries of the head, the left and right shoulders, and the left and right arms of the user object.

In accordance with another exemplary aspect of the present invention, there is provided an apparatus for estimating the contour of a user object in a moving picture during video communications, in which a face detector extracts information about center coordinates and a size of a face of the user object from a moving picture frame, an edge extractor extracts edges from the moving picture frame, and an object detector estimates a boundary of a head of the user object using a semicircle, estimates boundaries of left and right shoulders and left and right arms of the user object using second-order function graphs that overlap the edges as much as possible (i.e. a largest portion of overlap), and estimates a whole contour of the user object according to the boundaries of the head, the left and right shoulders, and the left and right arms of the user object.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fees.

The above and other exemplary objects, features and advantages of certain exemplary embodiments of the present invention will become more apparent from the following detailed description taken in conjunction with the accompanying drawings, in which.

Throughout the drawings, the same drawing reference numerals will be understood to refer to the same elements, features and structures.

DETAILED DESCRIPTION

The matters defined in the description, such as a detailed construction and elements, are provided to assist in a comprehensive understanding of exemplary embodiments of the invention. Accordingly, those of ordinary skill in the art will recognize that various changes and modifications of the exemplary embodiments described herein can be made without departing from the scope and spirit of the invention. Also, descriptions of well-known functions and constructions may be omitted for clarity and conciseness when their inclusion may obscure appreciation of the subject matter of the present invention by a person of ordinary skill in the art.

The present invention provides a method for distinguishing an object from a background in a moving picture during video communications or a video call. Herein, the term "object" typically refers to a user participating in video communications.

In accordance with an exemplary embodiment of the present invention, the contour of an object can be estimated, for example, by using a semicircle and second-order function graphs. During video communications, the shapes of objects, i.e. users are similar mostly. They can be represented using a total of four second-order function graphs and one semicircle.

Figure 1:
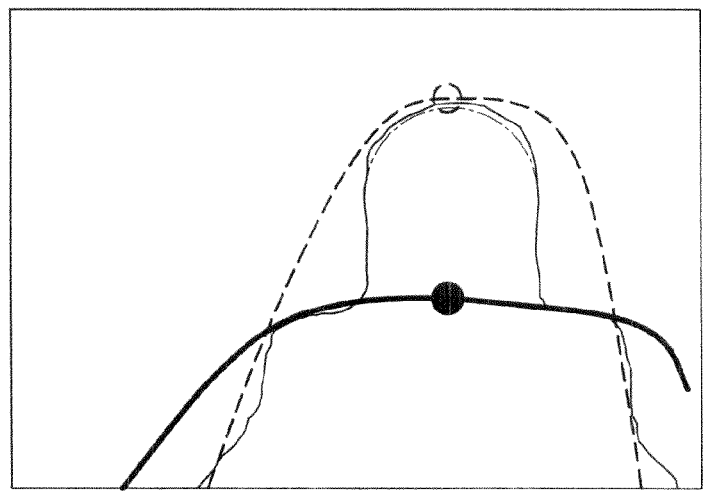
FIG. 1 illustrates a frame referred to describe the concept of a method for estimating the contour of an object in a moving picture according to an exemplary embodiment of the present invention.

FIG. 1 illustrates a frame referred to describe the concept of a method for estimating the contour of an object in a moving picture according to one exemplary embodiment of the present invention.

Referring now to FIG. 1, which is an image of the contours of a human body. Typically, the human head is almost circular. In most video communications, the boundary of a jaw is under those of a neck and shoulders and thus the jaw does not need modeling. The left and right shoulders and the left and right arms can be modeled using second-order function graphs, as illustrated in FIG. 1. The second-order function graphs that model the left and right shoulders are different. Therefore, the object is modeled with one semicircle and four second-order function graphs.

Figure 2:
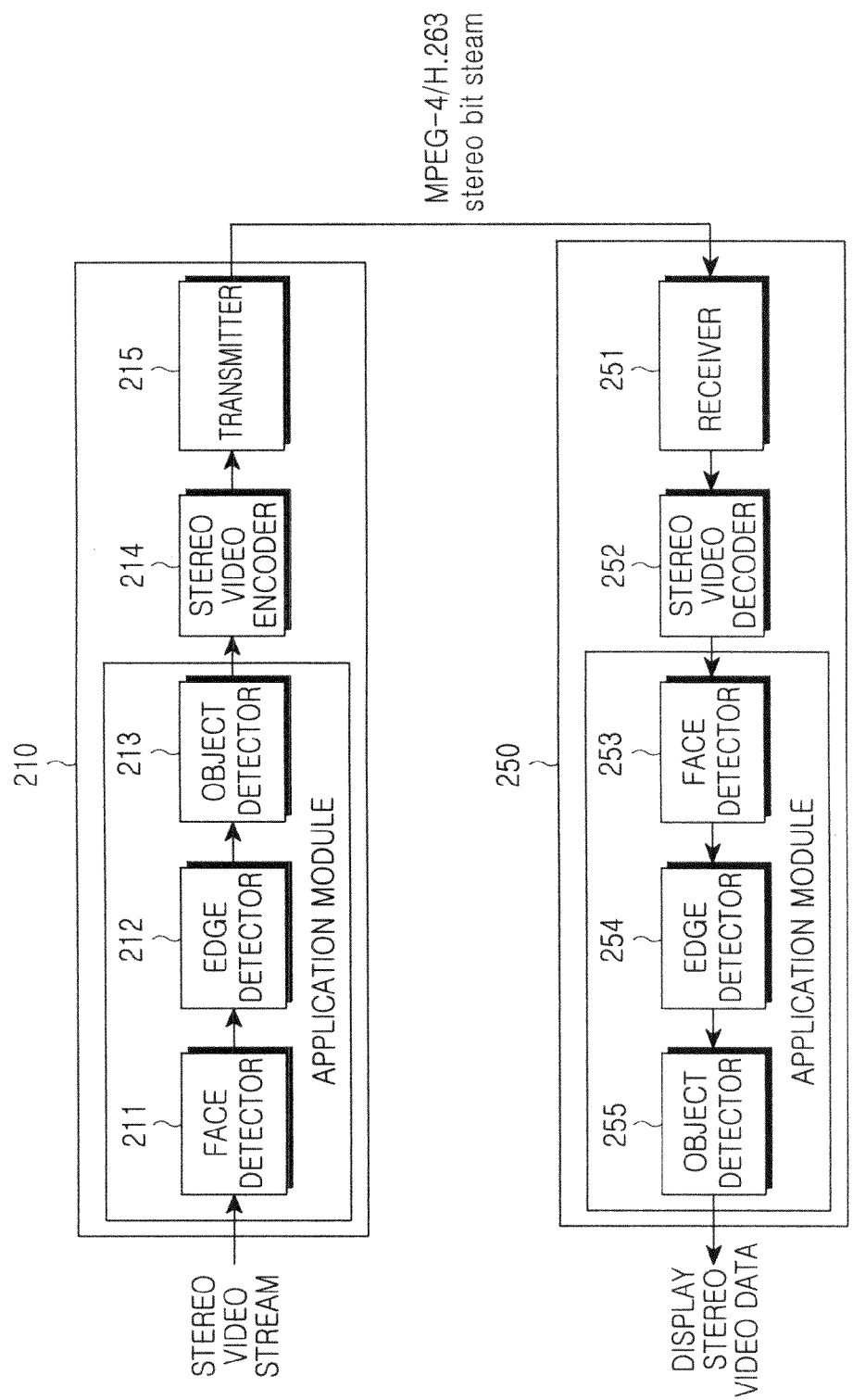
FIG. 2 is a block diagram of an object contour estimator for moving pictures according to an exemplary embodiment of the present invention.

FIG. 2 is a block diagram of one way an object contour estimator may be arranged for moving pictures according to an exemplary embodiment of the present invention. A transmission apparatus and a reception apparatus to which the present invention is applied under a stereo video environment are illustrated in FIG. 2. In accordance with the exemplary embodiment of the present invention, the object contour estimator includes a face recognizer 211, an edge detector 212, and an object detector 213, all of which can be arranged in a single application module. While in general, the object contour estimator resides in an image transmitter and estimates the boundary of an object, an image receiver can also be provided with the object contour estimator to perform the object contour estimation. In the illustrated case of FIG. 2, both the transmission and reception apparatuses have object contour estimators.

Referring now to FIG. 2, a transmission apparatus 210 includes a face detector 211 for receiving an image captured in a stereo video scheme and extracting the center coordinates and radius of a face by a face detection algorithm, an edge detector 212 for detecting edge information about an image using a Sobel operator, an object detector 213 for separating an object from a background in the image by curve fitting and line fitting, a stereo video encoder 214 for encoding stereo video data, and a transmitter 215 for transmitting the encoded bit stream to a reception apparatus 250.

The reception apparatus 250 includes, for example, a receiver 251 for receiving the encoded bit stream from the transmission apparatus, a stereo video decoder 252 for decoding the encoded bit stream, a face detector 253 for extracting the center coordinates and radius of the face from the decoded image by a face detection algorithm, an edge detector 254 for detecting the edge information about the image using a Sobel operator, and an object detector 255 for distinguishing the object from the background in the image by curve fitting and line fitting.

Still referring to FIG. 2, the object detectors 213 and 255 estimate the contour of the object by performing curve fitting and line fitting based on the face detection result and extracted edge values and thus modeling each part of the object. The object contour estimation will be described later in great detail.

Figure 3:
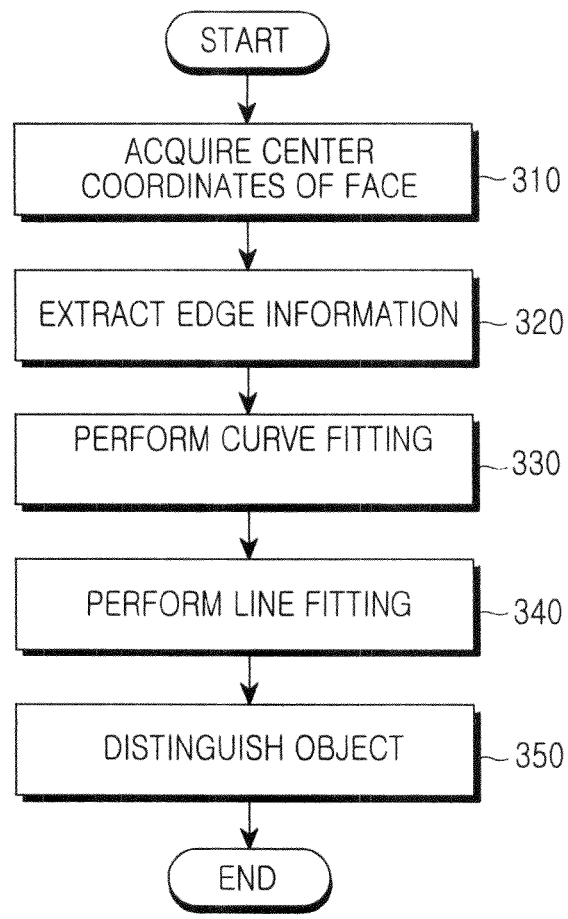
FIG. 3 is a flowchart illustrating exemplary operative steps for estimating the contour of an object contour in a moving picture according to an exemplary embodiment of the present invention.

FIG. 3 is a flowchart illustrating an example of operative steps for estimating the contour of an object contour in a moving picture according to an exemplary embodiment of the present invention. FIGS. 4A to 4D are frames sequentially illustrating the object contour estimation operation for a moving picture according to the exemplary embodiment of the present invention. A process for modeling an object using a semicircle and second-order function graphs will now be described with reference to FIGS. 3 to 4D.

Referring now to FIG. 3, information about the center coordinates and size of a face is acquired by a conventional face detection algorithm in step 310. There are many face detection algorithms. Among them, for example, an adaboost algorithm is preferably used, which stores characteristic elements inherent to a face and detects a face by comparing the characteristic elements with each pixel. Step 310 is visually illustrated in FIG. 4A.

Figure 4A:
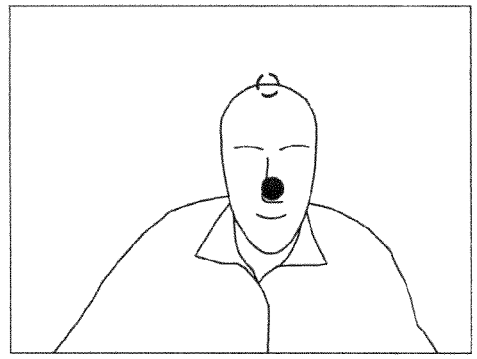
FIGS. 4A to 4D are frames sequentially illustrating the object contour estimation operation for a moving picture according to the exemplary embodiment of the present invention.
Figure 4C:
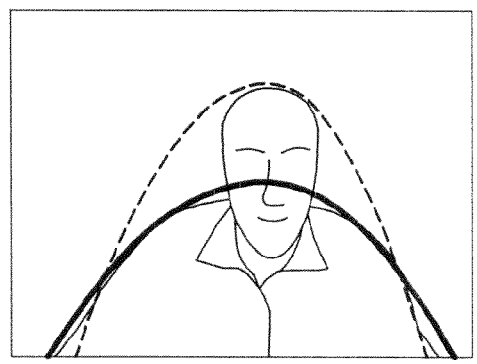
Figure 4D:
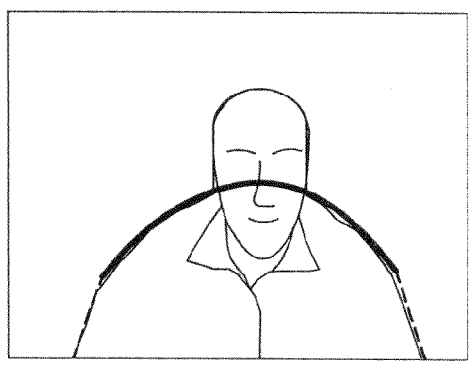
Figure 4B:

In step 320, the edges of an image can be extracted using, for example, a Sobel operator, as illustrated in FIG. 4B. In step 330, according to the present invention, curve fitting is performed based on the center coordinates of the face acquired in step 310 and edge energies acquired in step 320. The head of the object is first modeled to be semicircular and then its left and right shoulders and left and right arms are modeled using second-order function graphs.

In general, when the human head is modeled, the center coordinates of the semicircle are set to those of the face that are acquired by face detection. Then the radius of a circle is determined based on the information about the face size and an upper part of the head is modeled to an upper semicircle of the circle with the center coordinates and the radius. Straight lines are drawn down vertically from both end points of the semicircle and the head of the object is wholly modeled by adding the straight line to the points meeting the second-order function graphs that model the shoulders to the semicircle. The radius of the circle is determined based on the face size information achieved by face detection. The radius can be determined as the distance between the center coordinates of the face and the boundary of the face that can be achieved using the face size information.

Still referring to the flowchart in FIG. 3, the center coordinates of the second-order function graphs for the left and right shoulders are set to those of the face extracted in step 310 and their widths (the coefficients of second-order terms in the graphs) are determined based on the edges of the image extracted in FIG. 320. Specifically, the widths of the second-order function graphs are set such that the graphs overlap edges as much as possible. That is, the widths of the graphs are set so that edgy energies, i.e. the differences between the edges and the graphs, are minimized within an available range.

When the left shoulder is modeled, the center coordinates (i.e. vertex) of the second-order function graph for the left shoulder are set and its width is set so that as much of the left part of the second-order function graph as possible overlaps edges extracted from the image. The left part to the vertex of the second-order function graph is the modeling result for the left shoulder. The left part means the curve on the left of the vertex of the second-order function graph. An artisan understands and appreciates that left and right are terms of convention and while used in this context from the actual left shoulder of the object, depending on one's position relative to the object, such terms can also be reversed.

For the right shoulder, the center coordinates (i.e. vertex) of the second-order function graph for the right shoulder are set and its width is set so that as much of the right part of the second-order function graph as possible overlaps edges extracted from the image. The right part to the vertex of the second-order function graph is the modeling result for the right shoulder.

As to the second-order function graphs for the left and right arms, the coordinates of the top end of the face can be computed based on the center coordinates and size of the face extracted in step 310, and the center coordinates of the second-order function graphs for the left and right arms can be set to those of the top end of the face. The widths of these second-order function graphs can be determined so that the second-order function graphs overlap the edges extracted in step 320 as much as possible.

When the left arm is modeled, the center coordinates of the second-order function graph for the left arm can be set to those of the top end of the face. The width of this second-order function graph is determined so that the left part of the second-order function graph overlaps the edges extracted from the image. The left part of the vertex of the resulting second-order function graph is the modeling result of the left arm.

Also, the center coordinates of the second-order function graph for the right arm are set to those of the top end of the face. In addition, the width of this second-order function graph is determined so that the right part of the second-order function graph overlaps the edges extracted from the image. The right part of the vertex of the resulting second-order function graph is the modeling result of the right arm. An example of step 330 is illustrated in FIG. 4C.

When the modeling of the head, arms and shoulders is completed, their boundaries are extracted and thus head, arm, and shoulder parts are roughly distinguished. Then a whole object can be distinguished by adding overlap areas between an area under the boundary of the head and areas under the boundaries of the left and right arms to overlap areas between areas under the boundaries of the shoulders and areas under the boundaries of the arms.

An example of the object distinguished by the curve fitting is illustrated in FIG. 4D. In step 340, line fitting is performed based on the curve fitting.

Figure 5A:
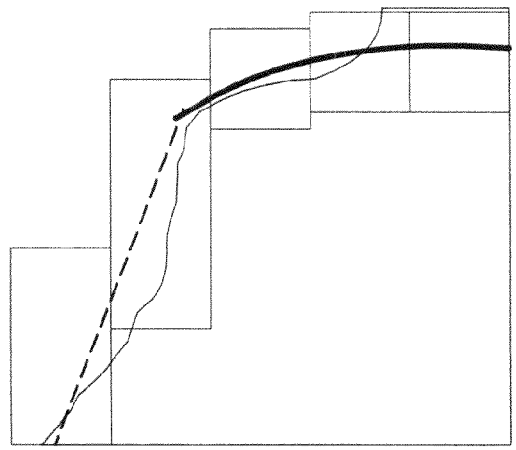
FIGS. 5A and 5B illustrate a exemplary case of wrong line fitting in the object contour estimation operation for a moving picture according to the exemplary embodiment of the present invention.

FIG. 5A illustrates an example of fragmentation for line fitting in the object contour estimation method for a moving picture according to the exemplary embodiment of the present invention.

Referring now to FIG. 5A, the curve resulting from the curve fitting is divided into fragments, each fragment having a predetermined equal width, and a height is set for each fragment so that the fragment can accommodate the estimated object boundary curve belonging to the fragment. In this case, the height is equal to or larger than a predetermined value.

Subsequent to the division of the curve fitting into fragments, a line that most overlaps with the boundary of the object is estimated for each fragment, taking into account all possible lines for the fragment.

Figure 5B:
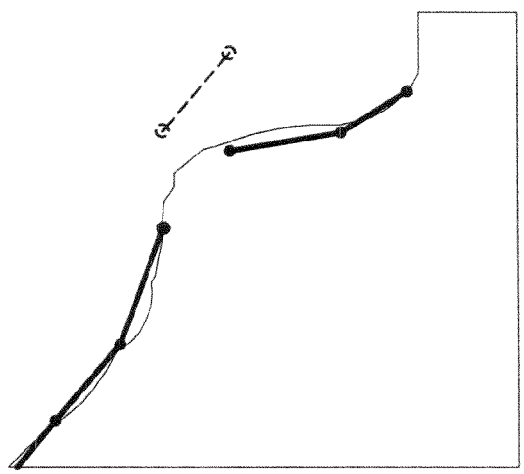

As illustrated in FIG. 5B, it is possible that the line fitting could lead to wrong boundary estimation. To avoid this problem, the present invention re-estimates the boundary based on reliability. A further discussion of reliability follows.

To increase the reliability of the object modeling, the longest estimated line resulting from the line fitting, that is, fragments connected to one another by the longest line, are considered to have the highest reliability, and a subsequent fragment is re-estimated based on the longest line. Referring to FIG. 5B, the line fitting results in a left line passing across three fragments, a middle line in one fragment, and a right line passing across two fragments. The left line is considered to be highly reliable and thus re-estimation is performed based on the left line.

Figure 6:
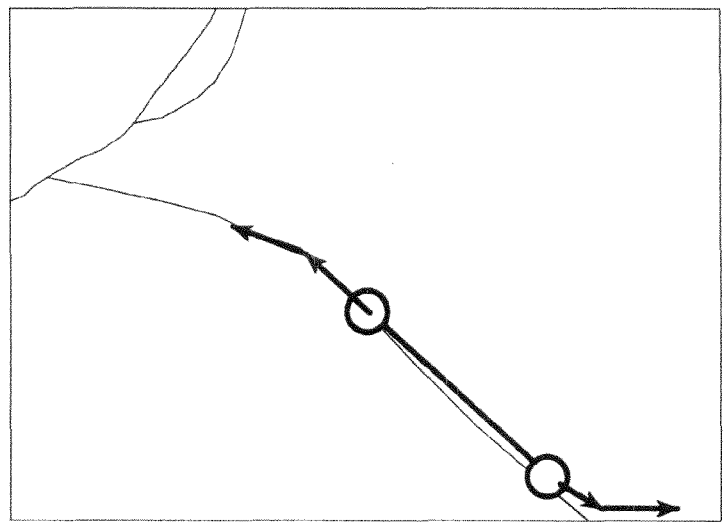
FIG. 6 illustrates an exemplary line fitting in the object contour estimation operation for a moving picture according to the exemplary embodiment of the present invention.

FIG. 6 illustrates an exemplary re-estimation during line fitting in the object contour estimation operation for a moving picture according to the exemplary embodiment of the present invention. Referring now to FIG. 6, the reliability of boundary estimation can be increased, for example, by starting lines in re-estimated fragments from the ends of a previous estimated line.

In step 350, the object is distinguished from the background as a result of the curve fitting and the line fitting.

Figure 7:
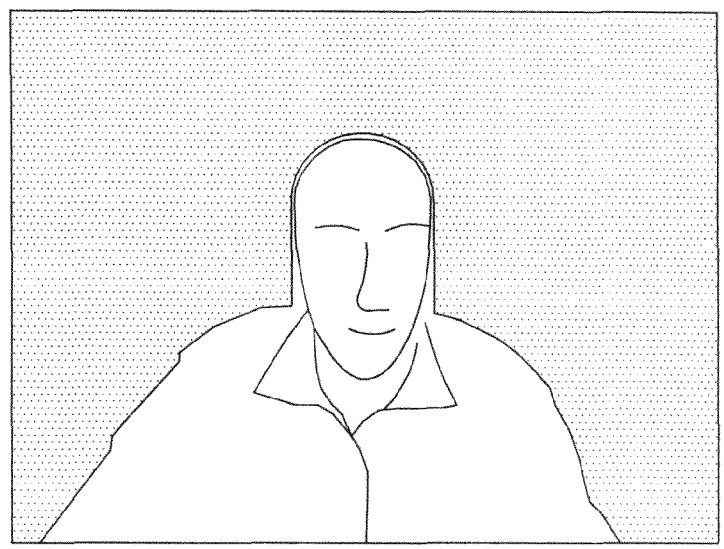
FIG. 7 illustrates a final result in the object contour estimation operation for a moving picture according to the exemplary embodiment of the present invention.

FIG. 7 then illustrates a final result in the object contour estimation operation for a moving picture according to the exemplary embodiment of the present invention. The object illustrated in FIG. 7 can be achieved by the above-described object contour estimation method. Since the object is estimated using four second-order function graphs and one semicircle, the contour of the object can be extracted efficiently in a short time with a reduced volume of computation.

As is apparent from the above description, the present invention advantageously extracts the contour of an object effectively even from an image with a complex background during video communications. Due to a small amount of computation, the present invention is suitable for a portable terminal and also for real-time video communications.

While the invention has been shown and described with reference to certain exemplary embodiments of the present invention thereof, they are mere exemplary applications. For example, the boundaries of the shoulders and arms can be estimated using a total of two second-order function graphs, one for the shoulders and the other for the arms, instead of four second-order function graphs. Also, the entire contour of the object may be provided to an image transmitter or other transmitter of a module for video or audio-visual communications, and/or stored in memory. The contoured image could be sent as a still image, thus protecting privacy as the background is missing, and permit the user to project this image as a still image along with real time audio communication. For example, if a user is awoken from sleep for a video communication and does not want their present image to be projected, the stored contour image can be retrieved from memory and projected to the other parties of the communication. Thus the privacy of the user can be maintained on more than one level.

Thus, it will be understood by those skilled in the art that various changes in form and details may be made therein without departing from the spirit and scope of the present invention as defined by the appended claims and their equivalents.

What is claimed is:

1. A method for estimating the boundary between a background and a user object of an image in a moving picture during video communications, comprising:
   (a) extracting information comprising center coordinates and a size of a face of the user object from a moving picture frame;
   (b) extracting edges of the user object from the moving picture frame;
   (c) estimating a boundary of a head of the user object by setting a semicircle to the head;
   (d) estimating boundaries of left and right shoulders and left and right arms of the user object with second-order function graphs that overlap a largest portion of the edges; and
   (e) estimating an entire contour of the user object according to the boundaries of the head, the left and right shoulders, and the left and right arms of the user object.

2. The method according to claim 1, further comprising (f) providing the entire contour of the user object to an image transmitter.

3. The method according to claim 1, further comprising storing the entire contour of the user object.

4. The method of claim 1, wherein the information extraction comprises extracting the information about the center coordinates and the size of the face by a face detection algorithm.

5. The method of claim 1, wherein the edge extraction comprises extracting the edges by a Sobel operator.

6. The method of claim 1, wherein the head boundary estimation in step (c) comprises setting a center of the semicircle to the center coordinates of the face, determining a radius of the semicircle using the information about the size of the face, and estimating the boundary of the head of the user object by adding an upper semicircle of a circle drawn with the center and the radius of the semicircle to straight lines drawn down vertically from both ends of the upper semicircle.

7. The method of claim 1, wherein the boundary of the left shoulder estimation in step (d) comprises setting a vertex of a second-order function graph for the left shoulder to the center coordinates of the face, determining a width of the second-order function graph for the left shoulder so that the second-order function graph for the left shoulder overlaps a largest portion of the edges, and estimating the boundary of the left shoulder using a left part of the vertex on the second-order function graph for the left shoulder.

8. The method of claim 1, wherein the boundary of the right shoulder estimation comprises setting a vertex of a second-order function graph for the right shoulder to the center coordinates of the face, determining a width of the second-order function graph for the right shoulder so that the second-order function graph for the right shoulder overlaps a largest portion of the edges, and estimating the boundary of the right shoulder using a right part of the vertex on the second-order function graph for the right shoulder.

9. The method of claim 1, wherein the boundary of the left arm estimation comprises computing coordinates of a top end of the face based on the information about the center coordinates and size of the face, setting a vertex of a second-order function graph for the left arm to the coordinates of the top end of the face, determining a width of the second-order function graph for the left arm so that the second-order function graph for the left arm overlaps a largest portion of the edges, and estimating the boundary of the left arm using a left part of the vertex on the second-order function graph for the left arm.

10. The method of claim 1, wherein the boundary of the right arm estimation comprises computing coordinates of a top end of the face based on the information about the center coordinates and size of the face, setting a vertex of a second-order function graph for the right arm to the coordinates of the top end of the face, determining a width of the second-order function graph for the right arm so that the second-order function graph for the right arm overlaps a largest portion of the edges, and estimating the boundary of the right arm using a right part of the vertex on the second-order function graph for the right arm.

11. The method of claim 1, wherein the entire contour of the user object estimation comprises:
   setting overlap areas between an area under the boundary of the head and areas under the boundaries of the left and right arms as first common areas;
   setting overlap areas between an area under the boundaries of the left and right shoulders and areas under the boundaries of the left and right arms as second common areas; and
   determining the sum of the first and second common areas to be the whole user object.

12. The method of claim 1, further comprising, after the entire contour of the user object estimation, performing a secondary contour estimation by dividing the contour of the object into fragments each having a predetermined equal width, setting a height for each of the fragments such that an estimated object boundary curve passing through the fragment can be accommodated within the fragment, and estimating a line that overlaps a largest portion of the edges as much as possible in each fragment.

13. The method of claim 12, further comprising, after the secondary contour estimation, re-estimating the object contour sequentially in fragments starting from a fragment next to a longest of lines estimated in the fragments.

14. The method of claim 13, wherein a re-estimate line includes an end point of a previous estimated line in an adjacent fragment.

15. An apparatus for estimating the contour of a user object in a moving picture image during video communications, comprising:
- a face detector for extracting information about center coordinates and a size of a face of the user object from a moving picture frame;
- an edge extractor for extracting edges from the moving picture frame; and
- an object detector for estimating a boundary of a head of the user object by setting a semicircle to the head of the user object, for estimating boundaries of left and right shoulders and left and right arms of the user object using second-order function graphs that overlap a largest portion of the edges, and estimating an entire contour of the user object according to the boundaries of the head, the left and right shoulders, and the left and right arms of the user object.

16. The apparatus of claim 15, wherein the face detector extracts the information about the center coordinates and size of the face by a face detection algorithm.

17. The apparatus of claim 15, wherein the edge extractor extracts the edges using a Sobel operator.

18. The apparatus of claim 15, wherein the object detector sets a center of the semicircle to the center coordinates of the face, determines a radius of the semicircle using the information about the size of the face, and estimates the boundary of the head of the user object by adding an upper semicircle of a circle drawn with the center and the radius of the semicircle to straight lines drawn down vertically from both ends of the upper semicircle.

19. The apparatus of claim 15, wherein the object detector sets a vertex of a second-order function graph for the left shoulder to the center coordinates of the face, determines a width of the second-order function graph for the left shoulder so that the second-order function graph for the left shoulder overlaps a largest portion of the edges, and estimates the boundary of the left shoulder using a left part of the vertex on the second-order function graph for the left shoulder.

20. The apparatus of claim 15, wherein the object detector sets a vertex of a second-order function graph for the right shoulder to the center coordinates of the face, determines a width of the second-order function graph for the right shoulder so that the second-order function graph for the right shoulder overlaps a largest portion of the edges, and estimates the boundary of the right shoulder using a right part of the vertex on the second-order function graph for the right shoulder.

21. The apparatus of claim 15, wherein the object detector computes coordinates of a top end of the face based on the information about the center coordinates and size of the face, sets a vertex of a second-order function graph for the left arm to the coordinates of the top end of the face, determines a width of the second-order function graph for the left arm so that the second-order function graph for the left arm overlaps a largest portion of the edges, and estimates the boundary of the left arm using a left part of the vertex on the second-order function graph for the left arm.

22. The apparatus of claim 15, wherein the object detector computes coordinates of a top end of the face based on the information about the center coordinates and size of the face, sets a vertex of a second-order function graph for the right arm to the coordinates of the top end of the face, determines a width of the second-order function graph for the right arm so that the second-order function graph for the right arm overlaps a largest portion of the edges, and estimates the boundary of the right arm using a right part of the vertex on the second-order function graph for the right arm.

23. The apparatus of claim 15, wherein the object detector sets overlap areas between an area under the boundary of the head and areas under the boundaries of the left and right arms as first common areas, sets overlap areas between an area under the boundaries of the left and right shoulders and areas under the boundaries of the left and right arms as second common areas, and determines the sum of the first and second common areas to be the whole user object.

24. The apparatus of claim 15, wherein after estimating the entire contour of the user object, the object detector performs a secondary contour estimation by dividing the contour of the object into fragments each having a predetermined equal width, setting a height for each of the fragments such that an estimated object boundary curve passing through the fragment can be accommodated within the fragment, and estimating a line that overlaps a largest portion of edges in each fragment.

25. The apparatus of claim 24, wherein after the secondary contour estimation, the object detector re-estimates the object contour sequentially in fragments starting from a fragment next to a longest of lines estimated in the fragments.

26. The apparatus of claim 25, wherein a re-estimate line includes an end point of a previous estimated line in an adjacent fragment.

\* \* \* \* \*